May 12, 1936.   O. W. KLAWUHN   2,040,487
SAFETY DEVICE FOR VEHICLES
Filed Feb. 7, 1935
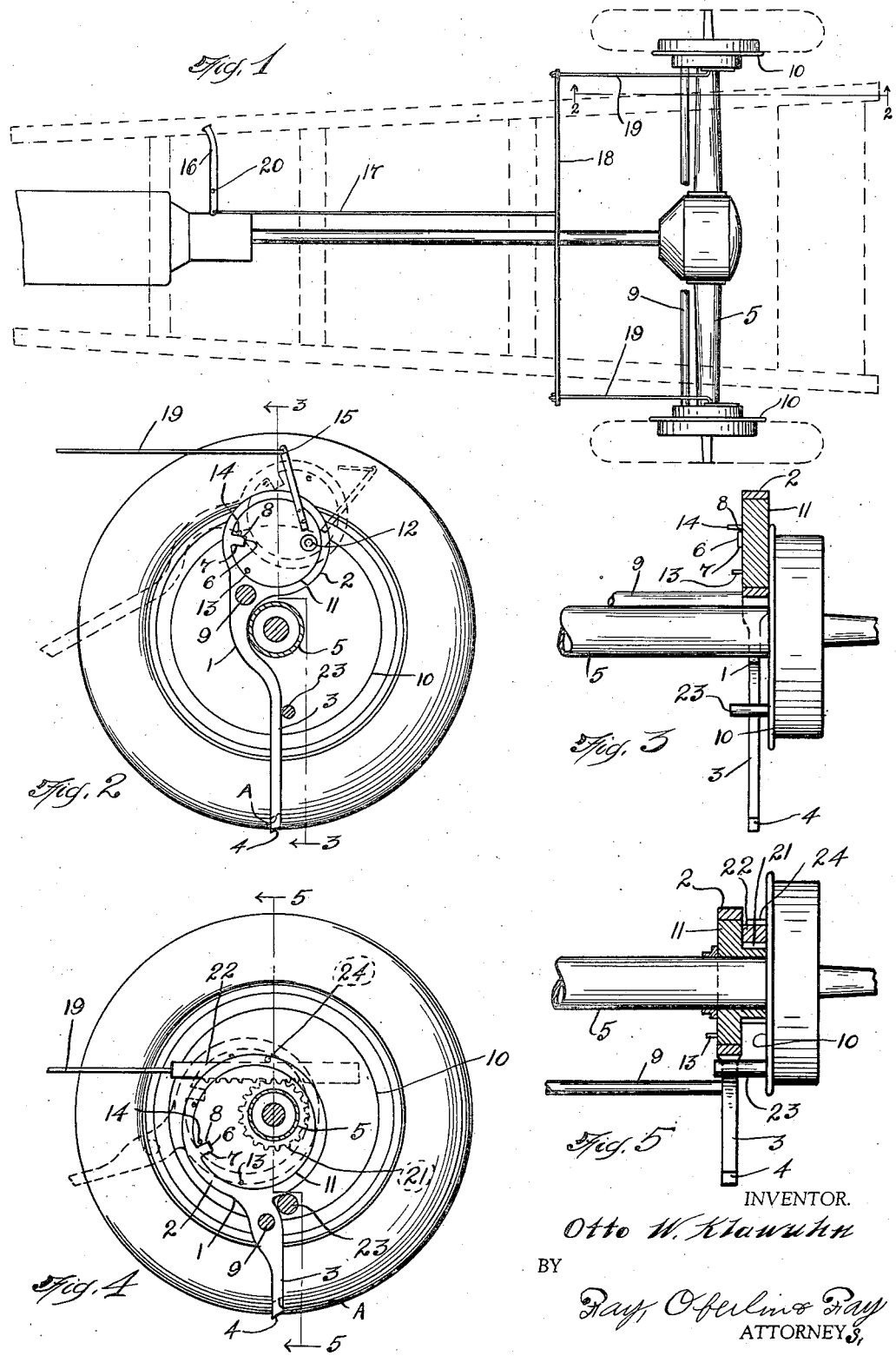

Patented May 12, 1936

2,040,487

UNITED STATES PATENT OFFICE 2,040,487

SAFETY DEVICE FOR VEHICLES

Otto W. Klawuhn, Rocky River, Ohio

Application February 7, 1935, Serial No. 5,504

9 Claims. (Cl. 188—5)

This invention relates, as indicated, to safety devices for vehicles, but has reference more particularly to devices of this character which are especially adapted to prevent skidding of automotive vehicles on ice-covered and wet roads, etc.

A primary object of the invention is to provide a safety device for automotive vehicles which may be quickly brought into use by the driver to prevent skidding of the vehicle on icy or wet pavements.

A further object of the invention is to provide a device of the aforesaid character which is adapted to be brought into operation or use by, and concurrently with, the movement of the emergency brake lever of the vehicle to its operative position.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but a few of the various mechanical forms in which the principle of the invention may be used.

In said annexed drawing:—

Fig. 1 is a view showing more or less diagrammatically the application of one form of the safety device to an automobile;

Fig. 2 is a cross-sectional view taken on the line 2—2 of Fig. 1;

Fig. 3 is a cross-sectional view, taken on the line 3—3 of Fig. 2;

Fig. 4 is a view similar to Fig. 2, but showing a modified form of the safety device; and Fig. 5 is a cross-sectional view, taken on the line 5—5 of Fig. 4.

Referring more particularly to that form of the invention disclosed in Figs. 1, 2 and 3, and which is adapted to be applied to existing automobiles, the device comprises a pair of transversely spaced members 1, the upper portion of which is in the form of an annulus 2, and the lower portion of which is in the form of a spike 3 radial to the annulus 2 and having a beveled end 4. That portion of each member 1 which joins the annulus and spike is curved to conform with and closely embrace the rear axle housing 5 of the automobile when the member is in operative position, as shown in Fig. 2. The annulus 2 has integrally formed therewith a lug 6 which extends laterally of the annulus and then radially inwardly and is provided with oppositely disposed abutment surfaces 7 and 8. The members 1 are maintained in spaced relation by means of a rod 9, and it will be further noted that these members are disposed adjacent the brake drum housings 10 of the vehicle.

For the purpose of moving the members 1 to their operative and inoperative positions, mechanism is provided which includes a disk cam 11 disposed within each annulus 2, each cam being rotatable about a stub shaft 12 extending from the brake drum housing. Each cam is provided adjacent its periphery with a pair of pins 13 and 14 and with a lever 15 which is rigidly secured to the cam and whereby the cam is rotated about its axis or stub shaft 12. Actuation of the levers 15 is effected by means of the emergency brake lever 16, through the intermediary of a link 17, cross-bar 18 and links 19, the latter being connected to the cross-bar 18 and the upper ends of the levers 15. The brake lever 16 is pivoted for movement about a point 20, intermediate its ends, so that upon actuation of the brake lever to its operative position, the lever 15 is moved from the dotted-line position shown in Fig. 2 to the solid line position therein shown.

Incidental to the aforesaid movement of the levers 15, the cams 11 are rotated bodily about the stub shafts 12, thereby lowering the members 1 to their position of use, as shown in solid lines in Fig. 2. In the last stages of this movement, the pin 14 will engage the surface 8 of the lug 6, with the result that the spiked members 1 will be positively actuated and brought to proper position for use. Pins 23, extending from the brake drum housing, assist the axle housing in preventing movement of the spiked members beyond their operative position.

With the spiked members in operative position, they will act to prevent skidding on icy and wet streets or roads. Upon release of the emergency brakes, the members 1 will first be elevated vertically, that is to say, the beveled ends 4 of the spikes 3 will be elevated to the position shown at A in Fig. 2. This movement corresponds to the movement of the pins 13 from their lowermost position to the point where they engage the surfaces 7 of the lugs 6. Thereafter, the spiked members will be positively carried to their inoperative position, as shown in dotted lines in Fig. 2.

It will be noted that the device thus described is of such construction that it may be applied to existing types of automobiles without requiring extensive alterations in the body or running gear of such automobiles.

In Figs. 4 and 5 is shown a modification of the safety device which is adapted to be built into the car at the factory.

In this form of the device, the cam 11 is mounted for rotation about the axle housing 5 and is provided with an extension 21 in the form of a gear or pinion. This pinion is adapted to be rotated by means of a rack 22 which is actuated by the link 19 in the same manner that the lever 15 in the previously described form of the invention is actuated. Stop pins 23, extending from the brake drum housing, serve to limit the rearward movement of the spiked members 1. The racks 22 may be maintained in mesh with the pinions 21 at all times by means of retaining pins 24 extending from the brake drum housing 10.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A safety device for automotive vehicles comprising ground-engaging members mounted for movement to and from a ground-engaging position, and rotatable cam means for moving said members from the ground-engaging position.

2. A safety device for automobiles comprising ground-engaging members mounted adjacent the rear wheels of the automobile and movable to a ground-engaging position, rotatable cam means for initially raising said members vertically to a position clear of the ground and means for thereafter rotating said members to an inoperative position.

3. A safety device for automobiles comprising members mounted adjacent the rear wheels of the automobile and provided with annular upper portions and ground-engaging lower portions, cam means disposed within said annular portions of said members and means for rotating said cams whereby to raise said members from the ground.

4. A safety device for automotive vehicles comprising members mounted for pivotal movement about the rear axle housing of the vehicle and movable from a ground-engaging position to an inoperative position, and cam members rotatable about said axle housing and operative when so rotated to elevate said members from said ground-engaging position.

5. A safety device for automotive vehicles comprising members mounted for pivotal movement about the rear axle housing of the vehicle and movable from a ground-engaging position to an inoperative position, said members having annular portions adjacent one end, and cam members disposed within said annular portions of said members and rotatable about said axle housing for elevating said first-named members from said ground-engaging position.

6. A safety device for automobiles comprising ground-engaging members mounted adjacent the rear wheels of the automobile and movable to a ground-engaging position and rotatable cam means for initially raising said members vertically to a position clear of the ground.

7. A safety device for automobiles comprising ground-engaging members mounted adjacent the rear wheels of the automobile and movable to a ground-engaging position, rotatable cam means for initially raising said members vertically to a position clear of the ground, means for thereafter rotating said members in a forward direction to an inoperative position, and means for preventing said members from moving rearwardly from said ground-engaging position.

8. In an automotive vehicle, the combination with the rear axle housing of collars mounted for oscillatory movement about said housing, said collars having eccentric openings therein, and skid-resisting ground-engaging members mounted on said collars, said members being movable clear of the ground in response to movement in one direction of said collars.

9. In an automotive vehicle, the combination with the rear axle housing of disk-like members mounted for oscillatory movement about said housing, said members having eccentric openings therein, and skid-resisting ground-engaging members having annular portions embracing said disk-like members, said ground-engaging members being movable clear of the ground by said disk-like members.

OTTO W. KLAWUHN.